(12) United States Patent
Li et al.

(10) Patent No.: US 11,314,581 B2
(45) Date of Patent: Apr. 26, 2022

(54) CONTROL METHOD OF DISK FAILURE, ELECTRONIC DEVICE AND COMPUTER READABLE STORAGE MEDIUM

(71) Applicant: EMC IP Holding Company LLC, Hopkinton, MA (US)

(72) Inventors: Chenglin Li, Chengdu (CN); Mingyi Luo, Chengdu (CN); Hongyuan Zeng, Sichuan (CN); Ruiyang Zhang, Chengdu (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/880,154

(22) Filed: May 21, 2020

(65) Prior Publication Data
US 2021/0117267 A1    Apr. 22, 2021

(30) Foreign Application Priority Data
Oct. 21, 2019    (CN) .......................... 201911002079.0

(51) Int. Cl.
G06F 11/00    (2006.01)
G06F 11/07    (2006.01)
G11B 17/022   (2006.01)

(52) U.S. Cl.
CPC ........ *G06F 11/0793* (2013.01); *G06F 11/076* (2013.01); *G06F 11/0727* (2013.01); *G11B 17/022* (2013.01)

(58) Field of Classification Search
CPC . G06F 11/0793; G06F 11/0727; G06F 11/076
See application file for complete search history.

(56) References Cited

U.S. PATENT DOCUMENTS

| | | | |
|---|---|---|---|
| 6,076,142 A * | 6/2000 | Corrington | G06F 1/184 710/306 |
| 6,356,441 B1 | 3/2002 | Claprood | |
| 6,560,098 B1 | 5/2003 | Beinor, Jr. et al. | |
| 6,695,149 B1 | 2/2004 | Cote et al. | |
| 6,850,410 B2 | 2/2005 | Peeke et al. | |
| 7,252,100 B1 | 8/2007 | Downes et al. | |
| 7,483,268 B1 | 1/2009 | King, Jr. et al. | |
| 10,013,325 B1 * | 7/2018 | Garrett, Jr. | G06F 11/0793 |
| 10,324,503 B1 | 6/2019 | O'Donnell et al. | |

* cited by examiner

*Primary Examiner* — Katherine Lin
(74) *Attorney, Agent, or Firm* — BainwoodHuang (57) ABSTRACT

Techniques for disk failure control involve determining the number of failed disks in a Redundant Array of Independent Disks (RAID). The techniques further involve comparing the number of failed disks with a predetermined threshold; and in accordance with a determination that the number of failed disks exceeds the predetermined threshold, setting at least one non-failing disk in the RAID into a protection mode to prevent the at least one non-failing disk from being disconnected. Such techniques facilitate prevention of the user data loss in the RAID.

23 Claims, 7 Drawing Sheets

FIG. 8

CONTROL METHOD OF DISK FAILURE, ELECTRONIC DEVICE AND COMPUTER READABLE STORAGE MEDIUM

CROSS-REFERENCE TO RELATED APPLICATION

This application claims priority to Chinese Patent Application No. CN201911002079.0, on file at the China National Intellectual Property Administration (CNIPA), having a filing date of Oct. 21, 2019, and having "THE CONTROL METHOD OF DISK FAILURE, ELECTRONIC DEVICE AND COMPUTER-READABLE STORAGE MEDIUM" as a title, the contents and teachings of which are herein incorporated by reference in their entirety.

FIELD

Embodiments of the present disclosure generally relate to the field of data storage, and more specifically to a method for disk failure control, electronic device and computer-readable storage medium.

BACKGROUND

A storage system usually has a plurality of storage disks, and a number of storage disks may be organized in a disk array. For example, a Redundant Array of Independent Disks (RAID) is a data storage virtualization technology that organizes a number of storage disks into a single logical unit for the purpose of data redundant backup and/or performance improvement. Taking RAID5 as an example, a RAID group (RG) may include five physical storage disks, which may be divided into block-level stripes with distributed parity information. When a single disk in RAID5 fails, subsequent data-reading may be calculated with the distributed parity information so that user data would not lost. Subsequently, a spare disk for the RAID may be selected for rebuilding the failed disk.

However, in actual application scenarios, due to the life cycle of the disks and other problems, some disks may need to be disconnected (e.g., plugged out). As the number of disks in the RAID is increasing, the probability that the plurality of disks in the RAID fail or get disconnected at the same time significantly increases, which leads to a corresponding increase in the probability of user data loss.

SUMMARY

Embodiments of the present disclosure provide a solution related to a method for disk failure control.

In a first aspect of the present disclosure, there is provided a method for disk failure control. The method includes: determining the number of failed disks in a Redundant Array of Independent Disks (RAID); comparing the number of failed disks with a predetermined threshold; and in accordance with a determination that the number of failed disks exceeds the predetermined threshold, setting at least one non-failing disk in the RAID into a protection mode to prevent the at least one non-failing disk from being disconnected.

The at least one non-failing disk can be prevented from being disconnected by setting at least one non-failing disk in the RAID into a protection mode in accordance with a determination that the number of failed disks exceeds the predetermined threshold. Therefore, the first aspect of the present disclosure helps avoid the loss of user data and significantly improves the reliability of RAID and the storage system.

In some embodiments, determining the number of failed disks in the RAID includes: detecting respective states of a plurality of disks comprised in the RAID; and determining the number of failed disks in the RAID based on the detected respective states of the plurality of disks.

In some embodiments, the determining the number of failed disks in the RAID based on the detected respective states of the plurality of disks includes: determining a first number of disks in a disconnected state and a second number of disks in an unhealthy state based on the respective states of the plurality of disks; and determining the number of failed disks in the RAID by summing the first number and the second number.

In some embodiments, setting the at least one non-failing disk into the protection mode includes: controlling a mechanical locking mechanism to lock the at least one non-failing disk in its mounting position, to prevent the at least one non-failing disk from being disconnected.

In some embodiments, setting the at least one non-failing disk into the protection mode includes: providing an indication mark associated with the at least one non-failing disk to remind a user of avoiding disconnection of the at least one non-failing disk.

In some embodiments, the method further includes: in accordance with a determination that at least one of the failed disks has been rebuilt with a new disk, updating the number of failed disks in the RAID after the rebuilding; in accordance with a determination that the updated number fails to exceed the predetermined threshold, causing the at least one non-failing disk to exit from the protection mode; and in accordance with a determination that the updated number exceeds the predetermined threshold, setting the new disk into the protection mode to prevent the new disk from being disconnected.

In some embodiments, causing the at least one non-failing disk to exit from the protection mode includes: in accordance with a determination that the at least one non-failing disk is locked by a mechanical locking mechanism in its mounting position in the protection mode, controlling the mechanical locking mechanism to unlock the at least one non-failing disk; and in accordance with a determination that an indication mark associated with the at least one non-failing disk is provided in the protection mode, ceasing the provision of the indication mark.

In a second aspect of the present disclosure, an electronic device is provided. The electronic device includes: at least one processing unit; and at least one memory coupled to the at least one processing unit and storing instructions executable by the at least one processing unit, the instructions, when executed by the at least one processing unit, causing the electronic device to perform acts. The acts include: determining the number of failed disks in a Redundant Array of Independent Disks (RAID); comparing the number of failed disks with a predetermined threshold; and in accordance with a determination that the number of failed disks exceeds the predetermined threshold, setting at least one non-failing disk in the RAID into a protection mode to prevent the at least one non-failing disk from being disconnected.

The at least one non-failing disk can be prevented from being disconnected by setting at least one non-failing disk in the RAID into a protection mode in accordance with a determination that the number of failed disks exceeds the predetermined threshold. Therefore, the electronic device in the second aspect of the present disclosure can avoid the loss of user data in the RAID and the storage system, and significantly improve the reliability of the storage system.

In some embodiments, determining the number of failed disks in the RAID includes: detecting respective states of a plurality of disks comprised in the RAID; and determining the number of failed disks in the RAID based on the detected respective states of the plurality of disks.

In some embodiments, determining the number of failed disks in the RAID based on the detected respective states of the plurality of disks includes: determining a first number of disks in a disconnected state and a second number of disks in an unhealthy state based on the respective states of the plurality of disks; and determining the number of failed disks in the RAID by summing the first number and the second number.

In some embodiments, setting the at least one non-failing disk into the protection mode includes: controlling a mechanical locking mechanism to lock the at least one non-failing disk in its mounting position, to prevent the at least one non-failing disk from being disconnected.

In some embodiments, setting the at least one non-failing disk into the protection mode includes: providing an indication mark associated with the at least one non-failing disk to remind a user of avoiding disconnection of the at least one non-failing disk.

In some embodiments, the acts further include: in accordance with a determination that at least one of the failed disks has been rebuilt with a new disk, updating the number of failed disks in the RAID after the rebuilding; in accordance with a determination that the updated number fails to exceed the predetermined threshold, causing the at least one non-failing disk to exit from the protection mode; and in accordance with a determination that the updated number exceeds the predetermined threshold, setting the new disk into the protection mode to prevent the new disk from being disconnected.

In some embodiments, causing the at least one non-failing disk to exit from the protection mode includes: in accordance with a determination that the at least one non-failing disk is locked by a mechanical locking mechanism in its mounting position in the protecting mode, controlling the mechanical locking mechanism to unlock the at least one non-failing disk; and in accordance with a determination that an indication mark associated with the at least one non-failing disk is provided in the protection mode, ceasing the provision of the indication mark.

In a third aspect of the present disclosure, a computer-readable storage medium is provided. The readable storage medium has a computer program stored thereon and, the computer program, when executed by a processor, causes the processor to perform acts. The acts include: determining the number of failed disks in a Redundant Array of Independent Disks (RAID); comparing the number of failed disks with a predetermined threshold; and in accordance with a determination that the number of failed disks exceeds the predetermined threshold, setting at least one non-failing disk in the RAID into a protection mode to prevent the at least one non-failing disk from being disconnected.

In some embodiments, determining the number of failed disks in the RAID includes: detecting respective states of a plurality of disks comprised in the RAID; and determining the number of failed disks in the RAID based on the detected respective states of the plurality of disks.

In some embodiments, determining the number of failed disks in the RAID based on the detected respective states of the plurality of disks includes: determining a first number of disks in a disconnected state and a second number of disks in an unhealthy state based on the respective states of the plurality of disks; and determining the number of failed disks in the RAID by summing the first number and the second number.

In some embodiments, setting the at least one non-failing disk into the protection mode includes: controlling a mechanical locking mechanism to lock the at least one non-failing disk in its mounting position, to prevent the at least one non-failing disk from being disconnected.

In some embodiments, setting the at least one non-failing disk into the protection mode includes: providing an indication mark associated with the at least one non-failing disk to remind a user of avoiding disconnection of the at least one non-failing disk.

In some embodiments, the acts further include: in accordance with a determination that at least one of the failed disks has been rebuilt with a new disk, updating the number of failed disks in the RAID after the rebuilding; in accordance with a determination that the updated number fails to exceed the predetermined threshold, causing the at least one non-failing disk to exit from the protection mode; and in accordance with a determination that the updated number exceeds the predetermined threshold, setting the new disk into the protection mode to prevent the new disk from being disconnected.

In some embodiments, causing the at least one non-failing disk to exit from the protection mode includes: in accordance with a determination that the at least one non-failing disk is locked by a mechanical locking mechanism in its the mounting position in the protection mode, controlling the mechanical locking mechanism to unlock the at least one non-failing disk; and in accordance with a determination that an indication mark associated with the at least one non-failing disk is provided in the protection mode, ceasing the provision of the indication mark.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

In the figures, the same or corresponding reference numerals indicate the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred embodiments of the present disclosure will be described in more detail with reference to the figures. Although the preferred embodiments of the present disclosure are shown in the figures, it should be understood that the present disclosure may be implemented in various forms and should not be limited by the embodiments set forth herein. Rather, these embodiments are provided to make the present disclosure more apparent and complete and convey the scope of the present disclosure completely to those skilled in the art.

As used herein, the term "comprises" and its variants are to be read as open-ended terms that mean "comprises, but is not limited to." Unless otherwise specified, the term "or" represents "or/and". The term "based on" is to be read as "based at least in part on." The term "one exemplary embodiment" and "an embodiment" are to be read as "at least one embodiment." The term "another embodiment" is to be read as "at least one other embodiment." Terms such as "first" and "second" may refer to different or identical objects. The text below might comprise other explicit and implicit definitions.

Figure 1:
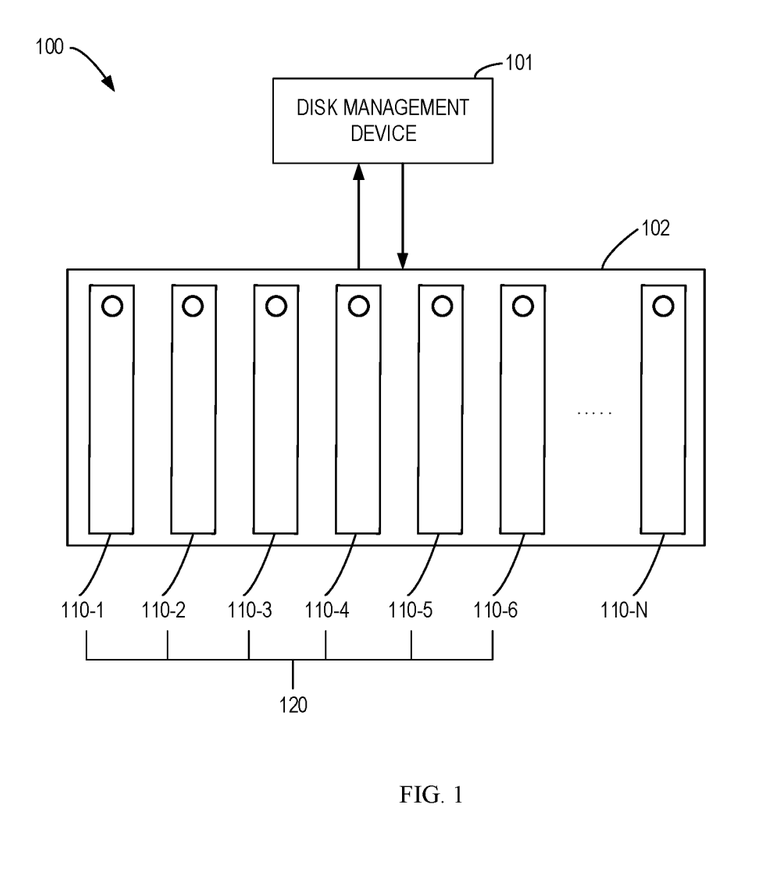
FIG. 1 illustrates a schematic diagram of a storage system according to an embodiment of the present disclosure.

FIG. 1 illustrates a schematic diagram of a storage system 100 according to an embodiment of the present disclosure. It should be appreciated that the structure and functions of the storage system 100 as shown in FIG. 1 are only for the purpose of example illustration, and do not imply any limitation to the scope of the present disclosure. Embodiments of the present disclosure may be embodied in different structures and/or functions.

As shown in FIG. 1, the storage system 100 includes a disk management device 101, a disk frame 102, and N disks 110-1, 110-2, 110-3, 110-4, 110-5, 110-6, . . . , 110-N (collectively or individually referred to as disk 110) mounted on the disk frame 102, where N is a positive integer greater than 1. The "disk" described herein may refer to any non-volatile storage medium currently known or developed in the future, such as a magnetic disk, an optical disk, or a solid state disk (SSD), and the like.

A plurality of disks in N disks may form a Redundant Array of Independent Disks (RAID). According to the required level of redundancy and performance, there are many types of RAID, such as RAID1/0 (1D+1D), RAID5 (4D+1P), RAID6 (4D+2P), etc., where D represents a data segment, and P represents a parity segment. Each RAID may have a corresponding RAID type. Each RAID may be composed of a plurality of RAID extents (RE for short). Each RE may include a data segment for storing user data and a parity segment for storing parity information.

FIG. 1 schematically shows a RAID 120 of RAID 6-type, which is composed of 6 disks 110-1 to 110-6. Each RE of the RAID 120 may include 4 data segments (i.e., "4D") and 2 parity segments (i.e., "2P"), forming a 4D+2P layout.

It should be appreciated that this is for the purpose of illustration only and does not imply any limitation on the scope of the present disclosure. Embodiments of the present disclosure may be applied to other types of RAIDs having other layouts. The disk management device 101 is used to manage a plurality of disks 110, e.g., detect a state of the disks, or distribution and rebuilding of the disks in the RAID, and the like. For example, the disk management device 101 may organize at least a portion of a plurality of segments in the plurality of disks 110 into a disk array 120.

As the number of disks in a RAID increases, the probability that the plurality of disks in the RAID fail or get disconnected at the same time significantly increases. Moreover, for the RAID, before the rebuilding of the failed disk is completed, some disks that are pulled out due to the uncertainty of manual operation may cause user data loss in the RAID.

An embodiment of the present disclosure provides a solution for disk failure control. The solution can improve data storage reliability of a storage system and prevent the loss of the user data. The solution of the embodiment of the present disclosure will be described below with reference to the figures.

Figure 2:
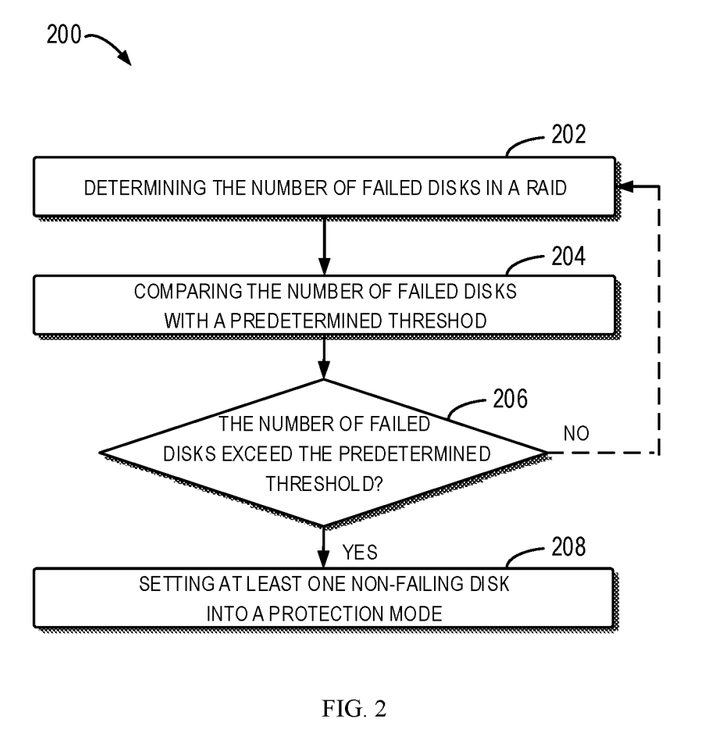
FIG. 2 illustrates a flowchart for a method for disk failure control according to some embodiments of the present disclosure.

FIG. 2 illustrates a flowchart for the method for disk failure control according to some embodiments of the present disclosure. Acts involved in the method 200 are described below with reference to the storage system 100 shown in FIG. 1. For example, in some embodiments, the method 200 may be performed by the disk management device 101. For ease of description, the method 200 will be described with reference to FIG. 1.

It should be understood that the method 200 may further include additional actions not shown and/or the acts shown may be omitted, and the scope of the present disclosure is not limited in this regard. It should be understood that although a RAID of RAID 6-type is used for illustration in some embodiments herein, the method 200 may be similarly applied to various RAID types, such as RAID 1/0 (1+1), RAID 5 (4+1), and the like.

At block 202, the disk management device 101 determines the number of failed disks in the RAID 120. Disks 110 in the storage system may fail for a variety of reasons. In some embodiments, the disk management device 101 may determine the number of failed disks based on the states of the plurality of disks 110 comprised in the RAID 120. For example, the disk management device 101 may detect the corresponding state of the plurality of disks comprised in the RAID, and determine the number of failed disks in the RAID based on the corresponding state of the plurality of disks.

The corresponding state of the disks 110 may include a disconnected state, an unhealthy state and a healthy state, wherein the disconnected state and/or the unhealthy state indicate that the disk 110 becomes failed and belongs to a failed disk. The disconnected state includes a state in which the disk is plugged out, or a state in which the disk's communicative connection with the outside has been disconnected although the disk is not plugged out. The unhealthy state may be determined for example based on at least one of the items such as average I/O latency, average I/O throughput, an error related to HBA hardware/firmware, an error related to linking, an error related to hard disk medium, and a Self-Monitoring Analysis and Reporting Technology (SMART) report of hard disks.

Figure 3:
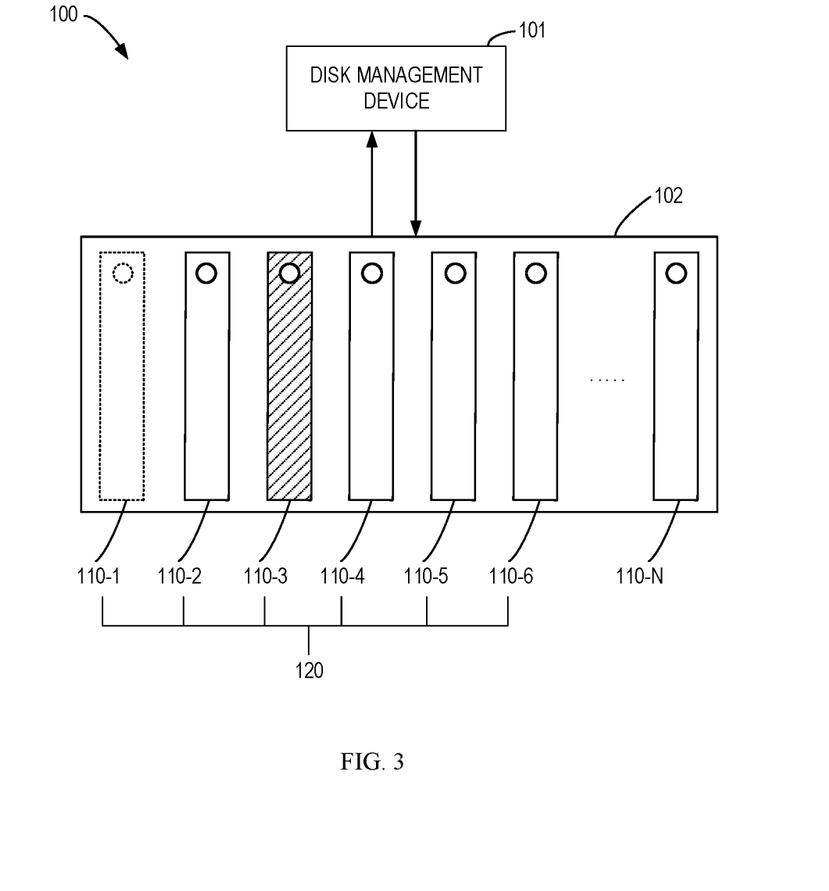
FIG. 3 illustrates a schematic block diagram showing a storage system with failed disks according to some embodiments of the present disclosure.

FIG. 3 schematically shows an example of failure of disks. As shown in FIG. 3, the disks 110-1 and 110-3 in the RAID 120 are failed disks. In particular, the disk 110-1 is in a pulled-out state, or although the disk 110-1 is not pulled out, the connection of the disk 110-1 to a socket such as a slot has been disconnected, that is, the disk 110-1 is in a disconnected state. The disk 110-3 is not plugged out and is not disconnected, but the disk 110-3 is in an unhealthy state, for example, the disk 110-3 is in various unhealthy states known in the art such as the HBA hardware/firmware error, the hard disk medium error and the disk error determined based on the SMART report.

In some embodiments, the disk management device 101 may determine a first number of disks in the disconnected state and a second number of disks in the unhealthy state based on the disconnected state or unhealthy state of the plurality of disks. After the first number and the second number are obtained, the number of the failed disks in the RAID is determined by summing the first number and the second number. Illustration is presented by using the example shown in FIG. 3, where the disk 110-1 of the RAID 120 is in a disconnected state, that is, the first number of disks in the disconnected state is equal to one. The disk 110-3 of the RAID 120 is in the unhealthy state, that is, the second number of disks in the unhealthy state is equal to one. After obtaining the first number equal to one and the second number equal to one, the number of failed disks in the RAID 120 is determined to be two by summing the two numbers.

At block 204, the disk management device 101 compares the number of failed disks with a predetermined threshold. In some embodiments, the predetermined threshold may be input by a user and then be stored in a storage unit readable by the disk management device 101. The predetermined threshold is related to the type of the RAID, that is, if the number of failed disks in the RAID exceeds the predetermined threshold, the data stored in the RAID will be lost because it cannot be rebuilt.

In some embodiments, the predetermined threshold may be 0 for the RAID1/0 (1+1) type; the predetermined threshold may be 0 for the RAID5 (4+1) type; the predetermined threshold may be 1 for the RAID6 (4+2) type.

At block 206, the disk management device 101 determines whether the determined number of failed disks exceeds the predetermined threshold. If the determined number of failed disks fails to exceed the predetermined threshold, the disk management device 101 may continue to monitor the number of failed disks in the RAID 120. If the determined number of failed disks exceeds the predetermined threshold, at block 208, the disk management device 101 sets at least one non-failing disk in the RAID into a protection mode.

At block 208, the disk management device 101 sets at least one non-failing disk in the RAID into the protection mode. In the protection mode, at least one non-failing disk is prohibited from being disconnected, for example, being plugged out. In practical application, a user may need to plug in the disk, plug out the disk or perform other operations to the disk 110 for various reasons. In this way, there is a risk of data loss as follows: when the number of failed disks of the RAID 120 has reached a predetermined threshold, the user data in the RAID 120 will be lost if the user disconnects other disks in the RAID 120 by mistake.

Accordingly, the present disclosure prevents the non-failing disks from being disconnected by the user by setting the protection mode to protect the non-failing disks in the RAID when the number of failed disks in the RAID has reached the predetermined threshold. In the protection mode, the non-failing disks in the RAID will be locked or provided with an indication mark to prevent them from being disconnected by the user, thereby effectively ensuring the security of user data.

For example, in the storage system 100 shown in FIG. 3, the RAID 120 (RAID6 type) includes disks 110-1, 110-2, 110-3, 110-4, 110-5 and 110-6. The disk management device 101 sets at least one non-failing disk in the RAID 120 into the protection mode in accordance with that the number of failed disks in the RAID 120 shown exceeds the predetermined threshold value 1 (i.e., the number of failed disks is greater than or equal to 2). For example, when the disk 110-1 is plugged out and the disk 110-3 is in the unhealthy state (the number of failed disks is equal to 2), in accordance with that the number of failed disks exceeding 1, the disk management device 101 sets at least one disk of non-failing disks 110-2, 110-4, 110-5 and 110-6 in the RAID6 into the protection mode. In some embodiments, the disk management device 101 may also set all the non-failing disks 110-2, 110-4, 110-5 and 110-6 in the RAID 6 into the protection mode.

In some embodiments, each disk 110 may be provided with a corresponding mechanical locking mechanism. In order to set the at least one non-failing disk into the protection mode, the disk management device 101 may control the mechanical locking mechanism to lock the at least one non-failing disk in its mounting position, thereby preventing the at least one non-failing disk from being disconnected. In some embodiments, the disk management device 101 may control the mechanical locking mechanisms to lock all the non-failing disks in the RAID in their mounting positions.

Figure 4:
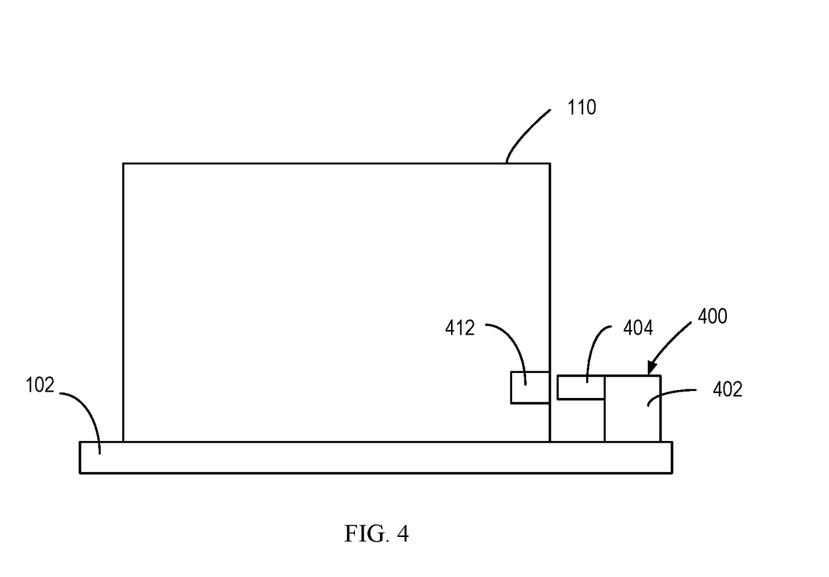
FIGS. 4 and 5 illustrate schematic diagrams of a mechanical locking mechanism for locking a disk according to some embodiments of the present disclosure.
Figure 5:
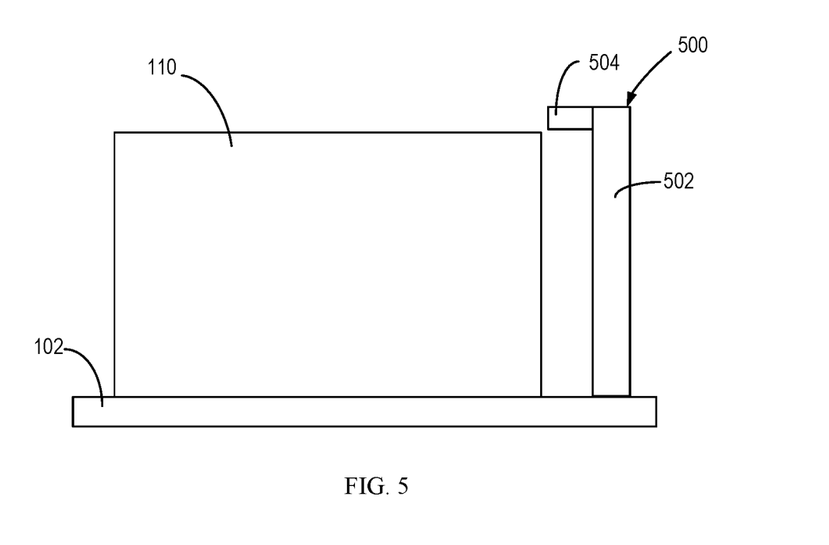

FIGS. 4 and 5 illustrate some examples of the mechanical locking mechanism for locking a disk according to some embodiments of the present disclosure. As shown in FIG. 4, the mechanical locking mechanism 400 includes a driving assembly 402 and a latch 404. The disk 110 is provided with a latch hole 412, and the driving assembly 402 and the latch 404 connected to the driving assembly 402 are provided at a position of the disk frame 102 corresponding to the disk 120. The latch 404 is adapted to be inserted into the latch hole 412. After receiving a control instruction from the disk management device 101, the drive assembly 402 drives the latch 404 to insert into the latch hole 412, so that the disk 110 is locked in its mounting position, thereby preventing the disk 110 from being pulled out, that is, the disk 110 is in the protection mode.

As shown in FIG. 5, the mechanical locking mechanism 500 includes a driving assembly 502 and a latch 504. The disk 110 is not provided with a structure such as a latch hole. The driving assembly 502 is provided at a position of the disk frame 102 corresponding to the disk 110. The mechanical locking mechanism 500 is higher than the disk 110 in height. The latch 504 connected to the driving assembly 502 is adapted to extend above a top surface of the disk 110. For example, in a state that the latch 504 is extended, a lower surface of the latch 504 abuts against the top surface of the disk 110. After receiving the control instruction from the disk management device 101, the driving assembly 502 drives the latch 504 to extend above the top surface of the disk 110, so that the disk 110 is locked in its mounting position, thereby preventing the disk 110 from being pulled out, that is, the disk 110 is in the protection mode.

It should be appreciated that all disks 110 of the storage system may have the same latch hole structure as the latch 412, respectively, and the mechanical locking mechanism 400 includes the driving assemblies 402 and latches 404 provided on the disk frame 102 corresponding to the respective disks, to lock the disk 110 in its mounting position.

Certainly, all the disks of the storage system may not be provided with a latch hole structure, and only the mechanical locking mechanism 500 as shown in FIG. 5 is provided on the disk frame 102 corresponding to the respective disks, to lock the disk 110 in its mounting position.

In some embodiments, the mechanical locking mechanisms 400 and 500 shown in FIG. 4 and FIG. 5 may be used in the storage system 100 simultaneously to lock different disks 110 with different mechanical locking mechanisms, respectively.

In some embodiments, in order to set the at least one non-failing disk into the protection mode, in addition to or as an alternative to arranging the mechanical locking mechanism, the disk management device 101 may also provide at least one non-failing disk with an indication mark associated therewith. The indication mark may remind a user of avoiding disconnection of the least one non-failing disk.

Figure 6:
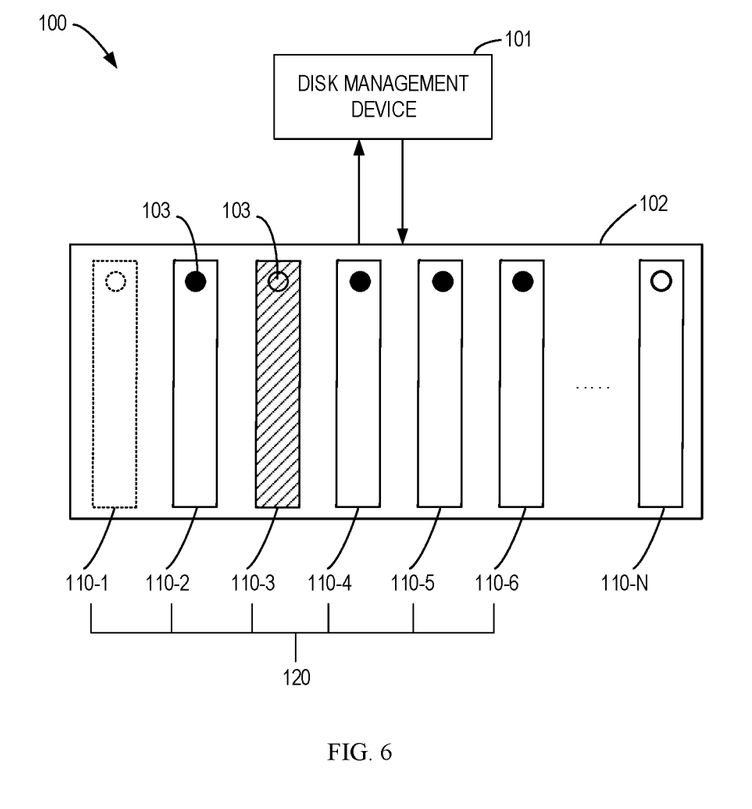
FIG. 6 illustrates a schematic diagram of providing an indication mark for a disk according to some embodiments of the present disclosure.

FIG. 6 illustrates a schematic diagram of providing an indication mark for the disk 110. In some embodiments, as shown in FIG. 6, each disk of the storage system is provided with an indication mark 103, and the indication mark 103 may be, for example, an indicator light and/or a display screen.

In the protection mode, the indication mark 103 in the indicator light mode may be lit or highlighted, and the indication mark 103 in the display screen mode may display a mark such as a Chinese character, a letter or a specific symbol that would be easily noticed by the user.

In some embodiments, referring to the description about FIG. 3, in the storage system 100 shown in FIG. 6, when the disks 110-1 and 110-3 of the RAID 120 (which is of a RAID 6 type) are in the disconnected state and unhealthy state, respectively (the number of failed disks is equal to 2, that is, the number of failed disks exceeds the predetermined threshold 1), the disk management device 101 sets at least one of the non-failing disks 110-2, 110-4, 110-5 and 110-6 in the RAID 120 into the protection mode. In some embodiments, the disk management device 101 may also set all the non-failing disks 110-2, 110-4, 110-5 and 110-6 in the RAID 120 into the protection mode.

For example, in the protection mode, the disk management device 101 provides the indication mark 103 for each of the non-failing disks 110-2, 110-4, 110-5 and 110-6 in the RAID 120. For example, the indication mark 103 is physically lit, or displays a Chinese word, a letter or a specific symbol. A solid black circle in FIG. 6 indicates that the indication mark 103 (for example, an indicator light) provided on the disk 110 is turned on.

In some embodiments, the indication mark for reminding a user may not be physically disposed on each disk 110. For example, the indication mark may be an interface mark at an interface element corresponding to the disk 110 on a user interface. In a further example, the indication mark 103 may be an indicator light and/or a display screen provided at a position corresponding to the disk 110 on the disk frame 102. In the protection mode, the indication mark 103 in the interface mark mode may be highlighted and/or flashed to remind a user that the corresponding disk has already been set into the protection mode.

Based on the above discussion, the solution of disk failure control is provided by the present disclosure. This solution may improve the data storage reliability of the storage system and prevent loss of the user's data by setting the non-failing disks into the protection mode.

Figure 7:
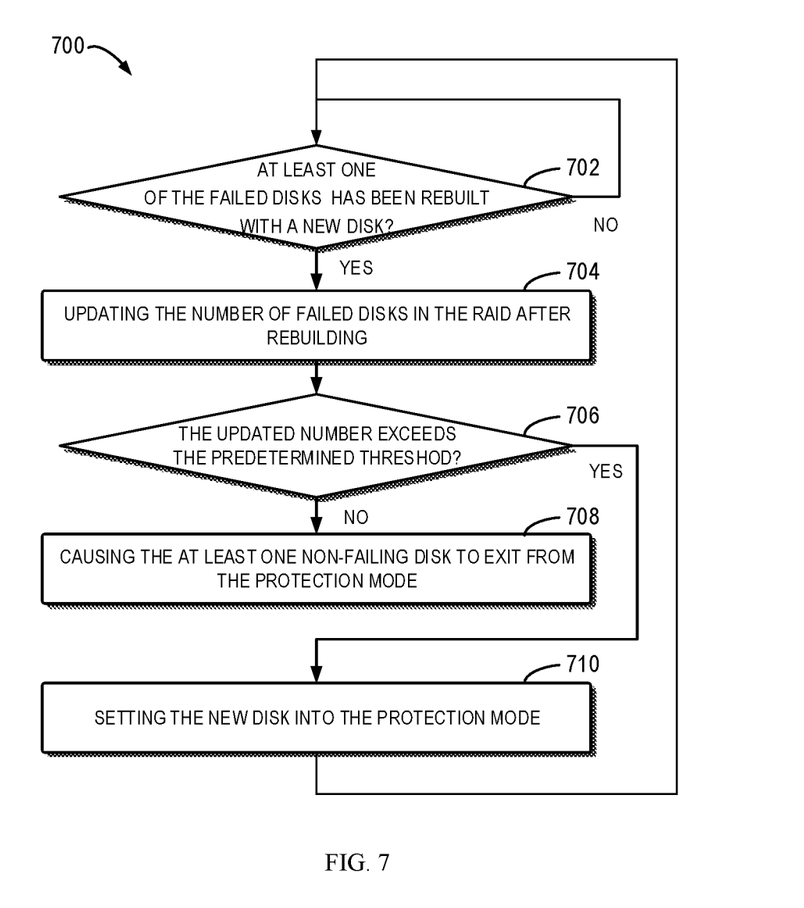
FIG. 7 illustrates a further flowchart for the method for disk failure control according to some embodiments of the present disclosure.

After the non-failing disk in the RAID is set into the protection mode, the disk management device 101 may also perform subsequent processing acts to further protect user data. Usually, after the disk 110 of the RAID 120 fails, the failed disk may be rebuilt by a rebuilding process. The time at which each failed disk is rebuilt might be uncertain. In some embodiments, the disk management device 101 may further determine whether the rebuilding of disk is completed, in order to make the non-failing disk that has been set into the protection mode exit from the protection mode. FIG. 7 illustrates a further flowchart for the method for disk failure control according to some embodiments of the present disclosure. In some embodiments, according to the method for disk failure control according to the present disclosure, after completing execution of the blocks in FIG. 2 (for example, after completing execution of block 208 in FIG. 2), the disk management device 101 may execute block 702 through block 710 in FIG. 7.

After setting at least one non-failing disk in the RAID into the protection mode, the disk management device 101 may further use new disk(s) to rebuild the one or more failed disks in the RAID.

At block 702, the disk management device 101 determines whether at least one of the failed disks in the RAID has been rebuilt with a new disk. If it is not detected that one or more failed disks has been rebuilt, the disk management device 101 may continue to monitor.

If it is determined that at least one failed disk has been rebuilt with a new disk, at block 704, the disk management device 101 updates the number of failed disks in the RAID after the rebuilding. In some embodiments, the disk management device 101 may determine the updated number of failed disks by subtracting the number of failed disks that have been rebuilt from the number of original failed disks. Certainly, in some embodiments, the disk management device 101 may also update the number of failed disks in the RAID after the rebuilding in the manner described above.

After updating the number of failed disks in the RAID after the rebuilding, at block 706, the disk management device 101 compares the updated number with the predetermined threshold to determine whether the updated number exceeds the predetermined threshold. If the updated number fails to exceed the predetermined threshold, this means that it is no longer necessary to set the disk in the protection mode. This is because the RAID itself can already provide sufficient data protection. Therefore, if the updated number fails to exceed the predetermined threshold, the disk management device 101 causes at least one non-failing disk to exit from the protection mode at block 708. In some embodiments, for example, the disk management device 101 may cause all the non-failing disks to exit from the protection mode.

In some embodiments, in a case that at least one non-failing disk in the RAID is locked by a mechanical locking mechanism in its mounting position, the disk management device 101 controls the mechanical locking mechanism to unlock the at least one non-failing disk. In some embodiments, for example, the driving assemblies 402, 502 as shown in FIGS. 4 and 5 are controlled to retract the latches 404, 504 to unlock the locked disk 110 in the protection mode.

In some embodiments, in a case that an indication mark associated with the at least one non-failing disk is provided in the protection mode, the disk management device 101 may cease the provision of the indication mark, for example, turn off the indication mark 103, or cease display of a Chinese character, a letter or a specific symbol, or cancel highlighting and/or flashing display at the user interface, to unlock the disk 110 marked in the protection mode.

If the updated number exceeds the predetermined threshold, this means that the currently non-failing disks (including the new disk for rebuilding) still need to be protected. Therefore, the updated number exceeds the predetermined threshold. In accordance with that the updated number exceeds the predetermined threshold, the disk management device 101 sets the new disk into the protection mode at block 710 to prevent the new disk from being disconnected. Specifically, the disk management device 101 may set the new disk into the protection mode in any manner mentioned above.

After setting the new disk into the protection mode and in accordance with a subsequent rebuilding, the disk management device 101 may further update the number of failed disks in the rebuilt RAID, that is, return to block 702.

It should be appreciated that the method 700 may also include additional acts not shown and/or that the acts shown may be omitted, and the scope of the present disclosure is not limited in this regard.

Figure 8:
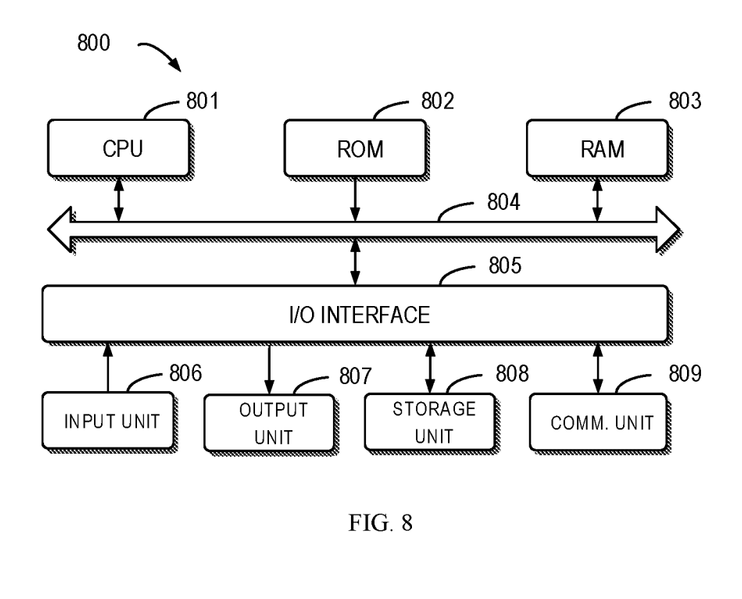
FIG. 8 illustrates a schematic block diagram of an electronic device capable of implementing a plurality of embodiments of the present disclosure.

FIG. 8 illustrates a schematic block diagram of an electronic device that may be used to implement a plurality of embodiments of the present disclosure. For example, the disk management device 101 shown in FIG. 1 may be implemented by an electronic device 800.

As shown, the device 800 includes a central processing unit (CPU) 801 which performs various acts and processing, based on computer program instructions stored in a read only memory (ROM) 802 or computer program instructions loaded from a storage unit 808 to a random access memory (RAM) 803. The RAM 803 stores therein various programs and data as required by operation of the device 800. The CPU 801, the ROM 802 and the RAM 803 are connected to one another via a bus 804. An input/output (I/O) interface 808 is also connected to the bus 804.

The following components in the device 800 are connected to the I/O interface 805: an input unit 806 such as a keyboard, a mouse, or the like; an output unit 807 such as various types of displays and a loudspeakers, etc.; the storage unit 808 such as a magnetic disk, optical disk, etc.; and a communication unit 809 such as a network card, a modem, a wireless communication transceiver, etc. The communication unit 809 allows the electronic device 800 to exchange information/data with other devices through a computer network such as the Internet and/or various telecommunication networks.

Various methods and processes described above may be executed by the processing unit 801, for example, the method 200 and/or method 700. For example, in some embodiments, the method 200 and/or method 700 may be implemented as a computer software program that is tangibly included in a machine-readable medium, e.g., the storage unit 808. In some embodiments, part or all of the computer program may be loaded and/or mounted onto the electronic device 800 via ROM 802 and/or communication unit 809. When the computer program is loaded in the RAM 803 and executed by CPU 801, one or more acts of the method 200 and/or method 700 described above may be executed.

The present disclosure may be a method, an apparatus, a system and/or a computer program product. The computer program product may include a computer-readable storage medium having computer-readable program instructions thereon for causing a processor to carry out aspects of the present disclosure.

The computer-readable storage medium may be a tangible device that may retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer-readable program instructions may also be stored in a computer-readable storage medium that may direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for disk failure control, comprising:
   determining the number of failed disks in a Redundant Array of Independent Disks (RAID);
   comparing the number of failed disks with a predetermined threshold; and
   in accordance with a determination that the number of failed disks exceeds the predetermined threshold, setting at least one non-failing disk in the RAID into a protection mode to prevent the at least one non-failing disk from being disconnected;
   wherein all disks in the RAID are mechanically unlocked from a disk frame during RAID operation to enable disconnection prior to setting the at least one non-failing disk in the RAID into the protection mode; and
   wherein the at least one non-failing disk in the RAID is mechanically locked to the disk frame after setting the at least one non-failing disk in the RAID into the protection mode.

2. The method according to claim 1, wherein determining the number of failed disks in the RAID comprises:
   detecting respective states of a plurality of disks comprised in the RAID; and
   determining the number of failed disks in the RAID based on the detected respective states of the plurality of disks.

3. The method according to claim 2, wherein determining the number of failed disks in the RAID based on the detected respective states of the plurality of disks comprises:
   determining a first number of disks in a disconnected state and a second number of disks in an unhealthy state based on the respective states of the plurality of disks; and
   determining the number of failed disks in the RAID by summing the first number and the second number.

4. The method according to claim 1, wherein setting the at least one non-failing disk into the protection mode comprises:
   controlling a mechanical locking mechanism to lock the at least one non-failing disk in its mounting position, to prevent the at least one non-failing disk from being disconnected.

5. The method according to claim 1, wherein setting the at least one non-failing disk into the protection mode comprises:

providing an indication mark associated with the at least one non-failing disk to remind a user of avoiding disconnection of the at least one non-failing disk.

6. The method according to claim 1, further comprising:
in accordance with a determination that at least one of the failed disks has been rebuilt with a new disk, updating the number of failed disks in the RAID after the rebuilding;
in accordance with a determination that the updated number fails to exceed the predetermined threshold, causing the at least one non-failing disk to exit from the protection mode; and
in accordance with a determination that the updated number exceeds the predetermined threshold, setting the new disk into the protection mode to prevent the new disk from being disconnected.

7. The method according to claim 6, wherein causing the at least one non-failing disk to exit from the protection mode comprises:
in accordance with a determination that the at least one non-failing disk is locked by a mechanical locking mechanism in its mounting position in the protection mode, controlling the mechanical locking mechanism to unlock the at least one non-failing disk; and
in accordance with a determination that an indication mark associated with the at least one non-failing disk is provided in the protection mode, ceasing the provision of the indication mark.

8. An electronic device, comprising:
at least one processing unit; and
at least one memory coupled to the at least one processing unit and storing instructions executable by the at least one processing unit, the instructions, when executed by the at least one processing unit, causing the electronic device to perform acts comprising:
determining the number of failed disks in a Redundant Array of Independent Disks (RAID);
comparing the number of failed disks with a predetermined threshold; and
in accordance with a determination that the number of failed disks exceeds the predetermined threshold, setting at least one non-failing disk in the RAID into a protection mode to prevent the at least one non-failing disk from being disconnected;
wherein all disks in the RAID are mechanically unlocked from a disk frame during RAID operation to enable disconnection prior to setting the at least one non-failing disk in the RAID into the protection mode; and
wherein the at least one non-failing disk in the RAID is mechanically locked to the disk frame after setting the at least one non-failing disk in the RAID into the protection mode.

9. The electronic device according to claim 8, wherein determining the number of failed disks in the RAID comprises:
detecting respective states of a plurality of disks comprised in the RAID; and
determining the number of failed disks in the RAID based on the detected respective states of the plurality of disks.

10. The electronic device according to claim 9, wherein determining the number of failed disks in the RAID based on the detected respective states of the plurality of disks comprises:

determining a first number of disks in a disconnected state and a second number of disks in an unhealthy state based on the respective states of the plurality of disks; and
determining the number of failed disks in the RAID by summing the first number and the second number.

11. The electronic device according to claim 8, wherein setting the at least one non-failing disk into the protection mode comprises:
controlling a mechanical locking mechanism to lock the at least one non-failing disk in its mounting position, to prevent the at least one non-failing disk from being disconnected.

12. The electronic device according to claim 8, wherein setting the at least one non-failing disk into the protection mode comprises:
providing an indication mark associated with the at least one non-failing disk to remind a user of avoiding disconnection of the at least one non-failing disk.

13. The electronic device according to claim 8, wherein the acts further comprise:
in accordance with a determination that at least one of the failed disks has been rebuilt with a new disk, updating the number of failed disks in the RAID after the rebuilding;
in accordance with a determination that the updated number fails to exceed the predetermined threshold, causing the at least one non-failing disk to exit from the protection mode; and
in accordance with a determination that the updated number exceeds the predetermined threshold, setting the new disk into the protection mode to prevent the new disk from being disconnected.

14. The electronic device according to claim 13, wherein causing the at least one non-failing disk to exit from the protection mode comprises:
in accordance with a determination that the at least one non-failing disk is locked by a mechanical locking mechanism in its mounting position in the protection mode, controlling the mechanical locking mechanism to unlock the at least one non-failing disk; and
in accordance with a determination that an indication mark associated with the at least one non-failing disk is provided in the protection mode, ceasing the provision of the indication mark.

15. A computer-readable storage medium having a computer program stored thereon, the computer program, when executed by a processor, causing the processor to perform acts comprising:
determining the number of failed disks in a Redundant Array of Independent Disks (RAID);
comparing the number of failed disks with a predetermined threshold; and
in accordance with a determination that the number of failed disks exceeds the predetermined threshold, setting at least one non-failing disk in the RAID into a protection mode to prevent the at least one non-failing disk from being disconnected;
wherein all disks in the RAID are mechanically unlocked from a disk frame during RAID operation to enable disconnection prior to setting the at least one non-failing disk in the RAID into the protection mode; and
wherein the at least one non-failing disk in the RAID is mechanically locked to the disk frame after setting the at least one non-failing disk in the RAID into the protection mode.

16. The computer-readable storage medium according to claim 15, wherein determining the number of failed disks in the RAID comprises:
  detecting respective states of a plurality of disks comprised in the RAID; and
  determining the number of failed disks in the RAID based on the detected respective states of the plurality of disks.

17. The computer-readable storage medium according to claim 16, wherein determining the number of failed disks in the RAID based on the detected respective states of the plurality of disks comprises:
  determining a first number of disks in a disconnected state and a second number of disks in an unhealthy state based on the respective states of the plurality of disks; and
  determining the number of failed disks in the RAID by summing the first number and the second number.

18. The computer-readable storage medium according to claim 15, wherein setting the at least one non-failing disk into the protection mode comprises:
  controlling a mechanical locking mechanism to lock the at least one non-failing disk in its mounting position, to prevent the at least one non-failing disk from being disconnected.

19. The computer-readable storage medium according to claim 15, wherein setting the at least one non-failing disk into the protection mode comprises:
  providing an indication mark associated with the at least one non-failing disk to remind a user of avoiding disconnection of the at least one non-failing disk.

20. The computer-readable storage medium according to claim 15, wherein the acts further comprise:
  in accordance with a determination that at least one of the failed disks has been rebuilt with a new disk, updating the number of failed disks in the RAID after the rebuilding;
  in accordance with a determination that the updated number fails to exceed the predetermined threshold, causing the at least one non-failing disk to exit from the protection mode; and
  in accordance with a determination that the updated number exceeds the predetermined threshold, setting the new disk into the protection mode to prevent the new disk from being disconnected.

21. The computer-readable storage medium according to claim 20, wherein causing the at least one non-failing disk to exit from the protection mode comprises:
  in accordance with a determination that the at least one non-failing disk is locked by a mechanical locking mechanism in its mounting position in the protection mode, controlling the mechanical locking mechanism to unlock the at least one non-failing disk; and
  in accordance with a determination that an indication mark associated with the at least one non-failing disk is provided in the protection mode, ceasing the provision of the indication mark.

22. The method according to claim 1, wherein all disks in the RAID are mechanically unlocked from a disk frame during RAID operation to enable disconnection prior to setting the at least one non-failing disk in the RAID into the protection mode; and
  wherein the all disks in the RAID are mechanically locked to the disk frame after setting the at least one non-failing disk in the RAID into the protection mode.

23. The electronic device according to claim 8, wherein all disks in the RAID are mechanically unlocked from a disk frame during RAID operation to enable disconnection prior to setting the at least one non-failing disk in the RAID into the protection mode; and
  wherein the all disks in the RAID are mechanically locked to the disk frame after setting the at least one non-failing disk in the RAID into the protection mode.

* * * * *